United States Patent
Cook et al.

(10) Patent No.: US 7,333,501 B2
(45) Date of Patent: Feb. 19, 2008

(54) TECHNIQUES FOR DETERMINING NETWORK NODES TO REPRESENT, MULTIPLE SUBNETWORKS FOR A ROUTING PROTOCOL

(75) Inventors: David Anthony Cook, Raleigh, NC (US); Russell White, Holly Springs, NC (US); Alvaro Retana, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 509 days.

(21) Appl. No.: 11/036,728

(22) Filed: Jan. 14, 2005

(65) Prior Publication Data
US 2006/0159095 A1   Jul. 20, 2006

(51) Int. Cl.
*H04L 12/28* (2006.01)
(52) U.S. Cl. ............ 370/401; 370/254; 370/392; 370/469
(58) Field of Classification Search ............ None
See application file for complete search history.

(56) References Cited

U.S. PATENT DOCUMENTS

| 6,473,431 | B1 | 10/2002 | Perlman et al. |
| 6,721,344 | B2 * | 4/2004 | Nakao et al. ............ 372/55 |
| 6,826,621 | B1 | 11/2004 | Kephart et al. |
| 7,190,696 | B1 * | 3/2007 | Manur et al. ............ 370/392 |
| 2002/0101821 | A1 * | 8/2002 | Feldmann et al. ............ 370/232 |

* cited by examiner

*Primary Examiner*—Duc Ho
(74) *Attorney, Agent, or Firm*—Evans & Molinelli PLLC; Eugene Molinelli (57) ABSTRACT

A method and apparatus are presented for determining network nodes for aggregating addresses in routing information used for routing data packets over a network. Link data and reachability data are received. Link data indicates direct links between each of multiple candidate routers of a network and a different router or a network segment. Reachability data indicates a set of one or more contiguous network addresses that can be reached on each link described in the link data. A measure of possible aggregation of contiguous network addresses is determined at the candidate routers based on the link data and the reachability data. A preferred router to aggregate addresses in routing information sent between routers in the network is determined among the candidate routers based on the measure of possible aggregation at each candidate router.

31 Claims, 5 Drawing Sheets

TECHNIQUES FOR DETERMINING NETWORK NODES TO REPRESENT, MULTIPLE SUBNETWORKS FOR A ROUTING PROTOCOL

BACKGROUND OF THE INVENTION

1. Field of the Invention

The present invention relates to determining network nodes that represent multiple subnetworks by aggregating their network addresses for routing of data packets across a network, and in particular to techniques for selecting an optimal set of one or more routers to aggregate network addresses of subnetworks within the network.

2. Description of the Related Art

Networks of general purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Some network layer addresses, including IP addresses are hierarchical and can be aggregated. Hierarchical addresses are organized into numerous groups and subgroups and subgroups of subgroups, etc. Each layer of subgroups successively narrow the address space until at, the finest level of granularity of the address space, a single element of the network is indicated (e.g., a network interface card on a network node). A group address aggregates the addresses in the subgroups of that group.

Routers and switches are network devices that determine which communication link or links to employ to support the progress of data packets through the network. A network node that determines which links to employ based on information in the internetwork header (layer 3) is called a router. Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A link-state protocol is an example of a routing protocol, which only exchanges control plane messages used for routing data packets sent in a different routed protocol (e.g., IP). In a link-state protocol, two routers establish an adjacency relationship between them by first verifying direct two-way communication between them over the same network segment and then synchronizing their link-state databases. Link-state data describe all links to a router and describes the network addresses reachable on each of those links, as well as other properties of the link. Once the adjacency relationship is established, the two routers are called peers. During a reliable flooding stage of a link-state protocol, each router is required to ensure that each of its peers has received the link-state data describing the router's own links.

As a consequence, resources on each router and many other network nodes are consumed for each set of addresses associated with each link. The resources consumed by the router include: memory to store the addresses associated with each link; processor time to compute a route based, at least in part, on the addresses reachable over each link; and both processor time and link bandwidth for sending, receiving and processing routing information involving the link. As the size of a network increases, the consumption of network resources also increases, interfering with the capacity of the protocol to scale up to a network with a large numbers of nodes. The capacity for a network protocol to scale up to a network with a large number of nodes is called the scalability of the protocol.

To reduce the consumption of network resources and improve scalability, some routing protocols divide a large network up into smaller subnetworks. For example, the Open System Interconnection (OSI) protocol suite and the Open Shortest Path First (OSPF) routing protocol divide a network into domains and areas. A domain is a portion of a network under the network administration of a single authority, such as an enterprise or Internet service provider (ISP). A domain is divided into areas. Each area is a group of contiguous subnetworks and attached end nodes specified by a network administrator. In OSI, routers communicate with each other using an intermediate system to intermediate system (IS-IS) protocol. According to IS-IS, routing within an area (level 1 routing) uses link-state data that distinguishes each link on each router in the area. Routing between areas (level 2 routing) goes through a level 2 router that aggregates the addresses reachable through that level 2 router. By aggregating routing information for addresses reachable over many links of a level 2 router, the amount of network resources consumed to maintain link-state data and make routing decisions can be reduced and network scalability can be enhanced.

The division of routers into areas is a manual process performed by human network administrators. As a result, the division is subjective based on the administrator's perceptions and is not guaranteed to be optimal in any objective sense. While this has been suitable for many past network domains, as networks become larger, approaching hundreds of thousands of nodes, the subjective approach to dividing areas becomes more tedious and error-prone. Furthermore, as networks become larger, sub-optimal divisions can lead to significant wasted resources and increased costs to service the same customer base for a network domain. In some circumstances, sub-optimal divisions can lead to instability and lack of resiliency in a network domain.

Based on the foregoing, there is a clear need for an objective approach to determining the division of a network domain into areas and the selection of routers to serve as routing information aggregation nodes. In general, there is a need for techniques to analyze a deployed or planned network and determine whether the configuration is optimal for the aggregation of address reachability and network topology information.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Techniques are described for determining one or more network nodes for aggregating addresses in routing information used for routing data packets over a network. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

2.0 Functional Overview

Techniques are provided for determining network nodes for aggregating addresses in routing information used for routing data packets over a network. The techniques objectively determine optimal routing aggregation nodes by combining information in a tree of reachability information with information in a graph of network connectivity information According to a first set of embodiments, a method includes receiving link data and reachability data. Link data indicates direct links between each router of multiple candidate routers in a network and at least one of a different router in the network and a network segment in the network. Reachability data indicates a set of one or more ranges of contiguous network addresses that can be reached on each link described in the link data. Based on the link data and the reachability data, a measure of possible aggregation of contiguous network addresses is determined at each of the candidate routers. Based on the measure of possible aggregation at each candidate router, a preferred router for aggregating addresses in routing information is determined among the candidate routers.

In some embodiments of the first set, a measure of routing performance improvement attainable by reconfiguring the network to aggregate addresses at the preferred router is determined.

In some embodiments of the first set, the domain of the network is re-configured to aggregate addresses at the preferred router.

In some embodiments of the first set, the candidate routers exclude a stub router that is an only router linked to a network segment.

In some embodiments of the first set, candidate routers exclude a router previously determined to be a preferred router.

In some embodiments of the first set, determining the measure of possible aggregation at each router includes determining an advertised set of address ranges for a particular link at a particular router. The advertised set of address ranges indicates the ranges of addresses reachable on one or more different links at the particular router, which are different from the particular link. The original address ranges in the advertised set are sorted and the number of address ranges is counted. Adjacent sorted address ranges are combined into a combined range, provided the combined range does not include an address of an actual node on the network that is not reachable on the different link at the particular router. The number of combined ranges in the combined set is counted. The measure of possible aggregation is based on the number of original address ranges and the number of combined ranges in the advertised set.

In some of these embodiments, determining the measure of possible aggregation includes computing a ratio of the number of original address ranges in the advertised set divided by the number of combined ranges in the advertised set. In some of these embodiments, determining the measure of possible aggregation also includes determining a weight based on a number of routers reachable on the particular link. The weight is multiplied by the ratio to determine a measure of possible aggregation at the particular node for the particular link.

In other sets of embodiments, an apparatus and a computer-readable medium are used to implement steps of the above methods.

These techniques allow a network design tool or a network monitoring tool, or a person using one of these tools, to determine objectively one or more optimal routing aggregation nodes within a planned or deployed network. This off line analysis does not consume network control plane resources yet provides for faster network design and real time network analysis. In some embodiments, these techniques are used in a tool sold to network designers that can be used outside the network itself, or in a tool used as part of a service to analyze a network design of a planned or deployed network. In some embodiments, these techniques are used in devices installed on the network to monitor in real time the health of the network and detect sub-optimal aggregation before it leads to problems in the network, such as instability or failure.

In the following sections, embodiments of the invention are described in the context of routers using IS-IS protocol to pass routing information among routers using IP addresses. In other contexts, the techniques are used by the same or different routing protocols in routers or in other intermediate network nodes or end nodes that perform routing functions that involve hierarchical addresses that can be aggregated.

2.0 IS-IS Routing Overview

Figure 1:
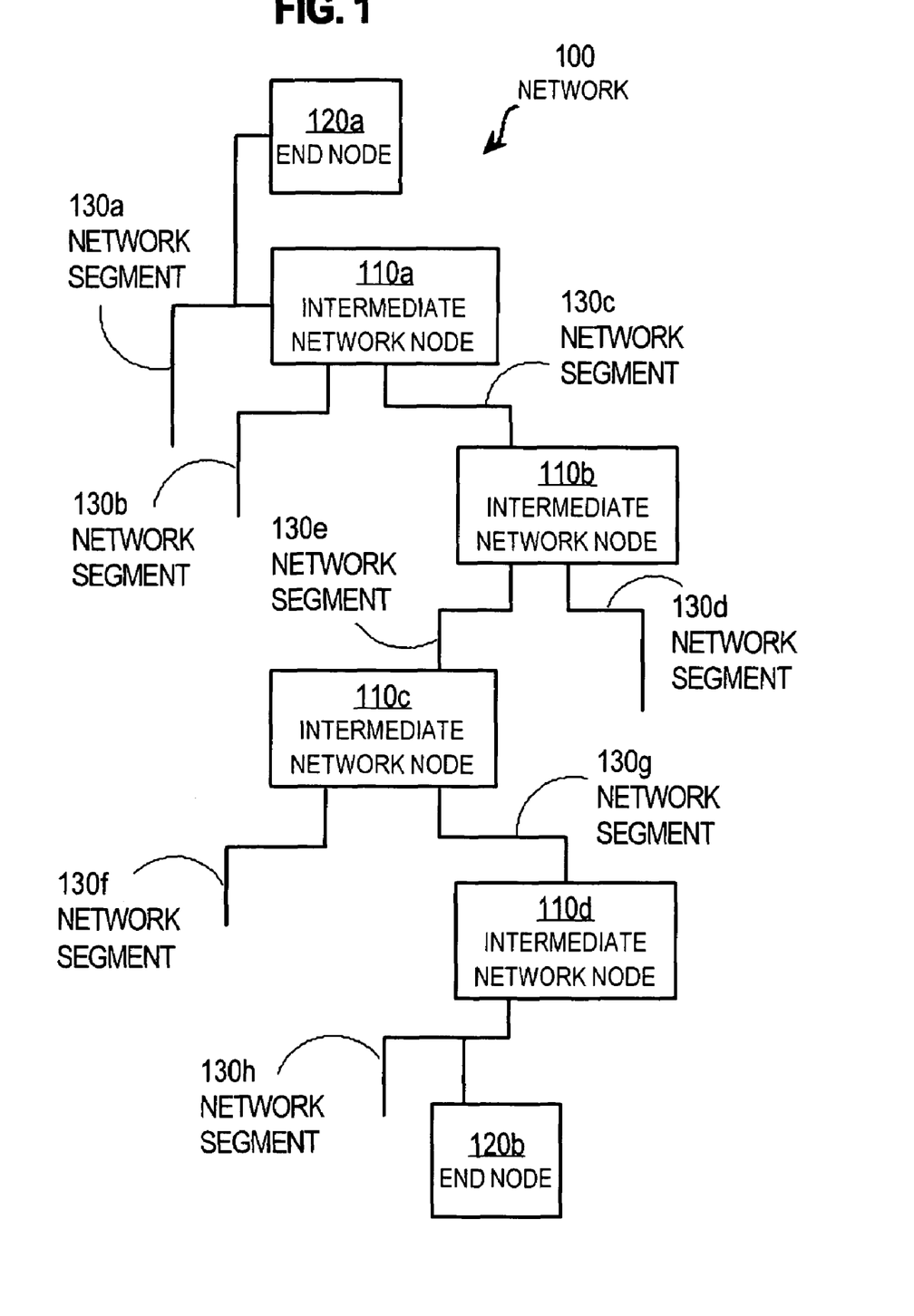
FIG. 1 is a block diagram that illustrates a network in which an embodiment of the invention may be implemented.

FIG. 1 is a block diagram that illustrates a network 100 in which an embodiment of the invention may be implemented. A computer network is a geographically distributed collection of interconnected sub-networks (e.g., network segments 130a, 130b, 130c, 130d, 130e, 130f, 130g, 130h, collectively referenced hereinafter as network segments 130) for transporting data between nodes, such as computer hosts. A local area network (LAN) is an example of such a sub-network. The network's topology is defined by an arrangement of end nodes (e.g., end nodes 120a, 120b collectively referenced hereinafter as end nodes 120) that communicate with one another, typically through one or more intermediate network nodes (e.g., intermediate network nodes 110a, 110b, 110c, 110d, collectively referenced hereinafter as intermediate network nodes 110), such as a routers or switches, that facilitate routing data between network segments 130 and between end nodes 120. A network segment 130 is a portion of network 100 without an intermediate network node 110.

Although, for purposes of illustration, there are depicted two end nodes 120, eight network segments 130 and four intermediate network nodes 110, in other embodiments, there are more or fewer end nodes, network segments, and intermediate network nodes.

As is well known in the art, each intermediate network node 110 stores a link-state database that describes the links of each intermediate network node 110 in the network 100. The link-state data for each link includes: an identifier for the link, for example a router identifier and a media access control (MAC) address of a router interface connected to the link; an identifier for another intermediate network node on that link, if any; a range of internetwork addresses for the network segment connected to that link; and sometimes a metric of performance of the link, such as bandwidth, number of end nodes, percent utilization, or some combination of these metrics. In the IS-IS protocol, the link-state databases describe the links in a partitioned portion called an area of a larger network.

An IP version 4 (designated IPv4) address for a particular network device, such as a network interface card, is made up of four octets. Each octet is eight binary digits (bits) that can represent a decimal number from 0 to 255. Thus an IPv4 address includes 32 bits. The IPv4 address is often expressed as four decimal numbers separated by periods. The smallest address is therefore 0.0.0.0 and the largest address is 255.255.255.255. A range of addresses, such as are used on the same subnetwork, like a network segment 130, is represented by the smallest address in the range and the number bits that do not change over the range. It is conventional to use all zeroes in the changing portion of the range for the smallest address. The number of bits that do not change over the range are often extracted from the address using a mask made up of a series of 1 digits corresponding to the digits that do not change followed by a series of one or more 0 digits to complete the 32 bits. The number of 1 digits in the mask is called the length of the mask. Thus, a range of IP addresses may be specified by a starting address and a mask length. The mask length is often designated by a number following a slash after the starting address. For example, a range of 256 addresses beginning at address 1.2.3.0 is expressed as 1.2.3.0/24. The first 24 bits of the address do not change as the addresses vary from 1.2.3.0 to 1.2.3.255. It is typical to assign ranges of addresses to a subnetwork that have a number of members that is a power of two, so that all addresses can be easily expressed with this notation. The address range is often referred to as a subnet or prefix.

Although described herein using IPv4 addresses, the techniques may also be used with other addresses that can be aggregated, including IPv6 addresses. An emerging network protocol, IPv6, is similar to IPv4 but uses more than 32 bits in each address.

For purposes of illustration, it is assumed that the network segments in FIG. 1 have the address ranges listed in Table 1.

TABLE 1

Example network address ranges for network segments in FIG. 1

| Network segment | address range |
| --- | --- |
| network segment 130a | 10.1.0.0/24 |
| network segment 130b | 10.1.1.0/24 |
| network segment 130c | 10.1.2.0/24 |
| network segment 130d | 10.1.3.0/24 |
| network segment 130e | 10.1.4.0/24 |
| network segment 130f | 10.1.7.0/24 |
| network segment 130g | 10.1.6.0/24 |
| network segment 130h | 10.1.5.0/24 |

In an IS-IS protocol implementation, a network administrator for network 100 might decide to divide network 110 into two areas separated by a level 2 router. The administrator wishes to determine which router should be selected as the level 2 router, or whether the network 100 should be divided at all. For purposes of illustration, it is assumed that the administrator makes a subjective decision to select a router serving as intermediate network node 110c as the level 2 router. According to an embodiment of the invention, an objective determination is made of the best router to select as the level 2 router.

3.0 Method for Determining Optimal Node for Aggregating Addresses

Figure 2:
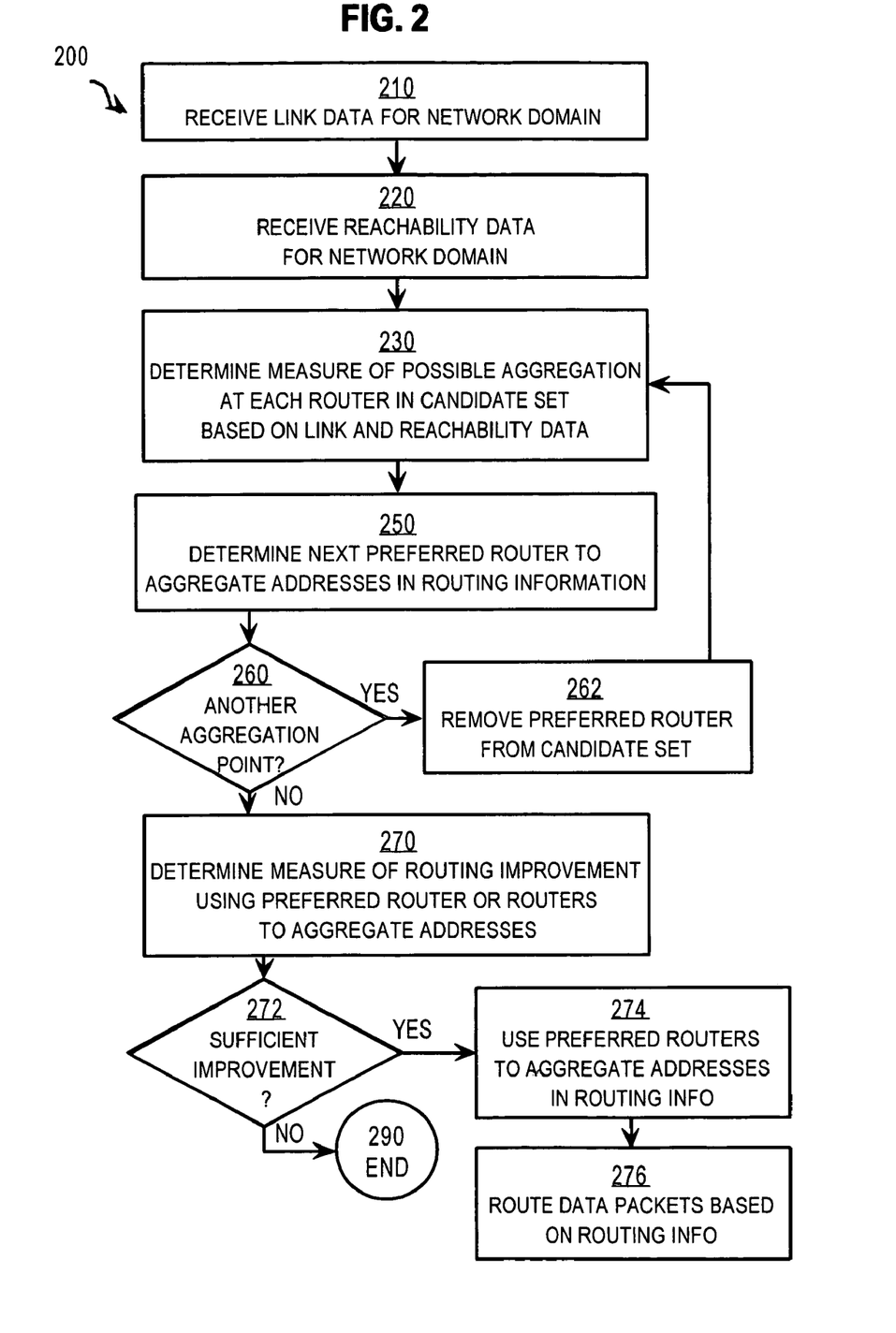
FIG. 2 is a flow diagram that illustrates at a high level a method to determine network nodes for aggregating addresses in routing information, according to an embodiment.

FIG. 2 is a flow diagram that illustrates at a high level a method to determine network nodes for aggregating addresses in routing information, according to an embodiment. Although steps are shown in a particular order for purposes of illustration in FIG. 2 and subsequent flow diagrams FIG. 3A and FIG. 3B, in other embodiments, one or more steps are performed in a different order or overlapping in time or are omitted, or are changed in some combination.

In step 210, link data is received for all intermediate network nodes in the domain to be considered. The link data describes the links at each intermediate network node. The link data may be received in any manner known in the art at the time the method is implemented. In some embodiments, the link-data is input manually. In some embodiments the link data is stored in a local file or database. In some embodiments, the link data is obtained from a link-state database assembled at each router according to a link-state protocol such as OSPF and IS-IS. In some embodiments, the data is assembled locally based on the protocol control plane messages sent along the network. In other embodiments, other methods for receiving the link data are used. The data received in step 210 includes all links within the network, without regard to any previously designated subjective boundaries of any type, such as previously defined subjective area boundaries. In the illustrated embodiment, the link data is received by monitoring control plane messages of the IS-IS protocol and is stored as a graph For example, in the illustrated embodiment, the graph of link data is listed in Table 2. For purposes of illustration, two characters designate each link ID. The first character is a letter that refers to a local node. The letters A, B, C, D represent nodes 110a, 110b, 110c, 110d, respectively. The second character in the link ID is a letter or numeral. The letter refers to a connected node. The numeral represents link to a network segment without another intermediate network node. In practice, the link ID is some other identification, such as a MAC address for a network interface card on the node.

TABLE 2

Example link data for network in FIG. 1

| intermediate node | link ID | connected element(s) |
|---|---|---|
| node 110a" | A1 | segment 130a |
| " | A2 | segment 130b |
| " | AB | segment 130c, node 110b |
| node 110b | BA | segment 130c, node 110a |
| " | B1 | segment 130d |
| " | BC | segment 130e, node 110c |
| node 110c | CB | segment 130e, node 110b |
| " | C1 | segment 130f |
| " | CD | segment 130g, node 110d |
| node 110d | DC | segment 130g, node 110c |
| " | D1 | segment 130h |

In step 220, reachability data is received for the network. The reachability data describes the subnetwork address ranges for network nodes on each network segment. The reachability data may be received in any manner known in the art at the time the method is implemented, as described above for the link data. In an illustrated embodiment, the reachability data includes the network address and mask length on each network segment. In this embodiment, the reachability data is received by monitoring control plane messages of the IS-IS protocol, and is stored in association with the network node to which each segment is attached.

For example, in the illustrated embodiment, the reachability data is added to the link data as listed in Table 3.

TABLE 3

Example connectivity graph for network in FIG. 1

| intermediate node | link ID | connected element(s) | prefix/ prefix length |
|---|---|---|---|
| node 110a" | A1 | segment 130a | 10.1.0.0/24 |
| " | A2 | segment 130b | 10.1.1.0/24 |
| " | AB | segment 130c node 110b | 10.1.2.0/24 |

TABLE 3-continued

Example connectivity graph for network in FIG. 1

| intermediate node | link ID | connected element(s) | prefix/ prefix length |
|---|---|---|---|
| node 110b | BA | segment 130c node 110a | 10.1.2.0/24 |
| " | B1 | segment 130d | 10.1.3.0/24 |
| " | BC | segment 130e node 110c | 10.1.4.0/24 |
| node 110c | CB | segment 130e node 110b | 10.1.4.0/24 |
| " | C1 | segment 130f | 10.1.7.0/24 |
| " | CD | segment 130g node 110d | 10.1.6.0/24 |
| node 110d | DC | segment 130g node 110c | 10.1.6.0/24 |
| " | D1 | segment 130h | 10.1.5.0/24 |

In step 230, a measure of possible aggregation is determined for each router in a candidate set of routers based on the link data and the reachability data. The candidate set of routers includes any routers in the domain. In some embodiments, the candidate set includes all routers in the domain. In some embodiments, the candidate set excludes stub nodes that do not share a network segment with any other intermediate network node (e.g., nodes 110a, 110d are stub nodes). In some embodiments, after a preferred node is objectively determined for aggregating routing information, the candidate set excludes the previously determined preferred node. For example, if node 110b is determined to be a preferred node for aggregating addresses in a previous application of the method, as described in more detail below, then node 110b is excluded from the candidate set. In the illustrated embodiment, all intermediate network nodes 110a, 110b, 110c, 110d are included in the candidate set.

Further details on steps that are performed during step 230 in an illustrated embodiment are described below with reference to FIG. 3A.

In step 250, one of the routers in the candidate set is selected as a preferred router for aggregating addresses in a routing protocol. Any method may be used for determining the preferred router. In an illustrated embodiment, the router with the greatest measure of possible aggregation among the routers in the candidate set is determined to be the preferred router. For example, the preferred router is selected as a level 2 router in the IS-IS protocol at the border of an area within a domain.

In step 260, it is determined whether there is to be another aggregation point for the network. For example, it is determined whether another level 2 router at the border of another area is to be determined. If so, control flows to step 262. In step 262, the router just selected as a preferred router is removed from the candidate set. Control then passes back to step 230 to determine additional possible aggregation at the routers remaining in the candidate set.

If it is determined in step 260 that there is not to be another aggregation point for the network, then control passes to step 270. In step 270, a measure of routing improvement is determined. The measure of routing improvement is based on the measures of possible aggregation for all the preferred routers and the degree of aggregation in a network with a different set of zero or more routers that aggregate addresses, such as an existing or planned network with subjectively selected aggregation points. Any method may be used to determine the improvement. For example, in some embodiments, the measure of possible aggregation using the preferred routers is compared to a threshold value. The sign and size of the difference between the measure of possible aggregation and the threshold is used to determine the improvement.

In step 272, it is determined whether the improvement is sufficient to change the network to aggregate addresses at the preferred routers. For example, in some embodiments, if a sum of the measures of possible aggregation for all the preferred routers does not exceed the threshold, then the improvement is determined to be insufficient to change the network. In some embodiments, if a difference between the measure of possible aggregation for a preferred router and the measure for a subjectively selected router does not exceed the threshold, then the improvement is determined to be insufficient to change the network If it is determined in step 272 that the improvement is insufficient, then control passes to step 290 to end the process without making a change to the existing or planned network.

If it is determined in step 272 that the improvement is sufficient, then control passes to step 274. In step 274, one or more of the preferred routers are used to aggregate addresses in routing information passed among routers in the network. In step 276, one or more data packets are routed based on the routing information aggregated by the one or more preferred routers.

These techniques allow off line analysis of a network design or implementation in the crucial aspect of optimal aggregation (summarization) without manual and error prone examination of a network. This allows faster, more accurate, and more objective network design for better network performance.

3.1 Determining Measure of Posssible Aggregation at a Node

Figure 3A:
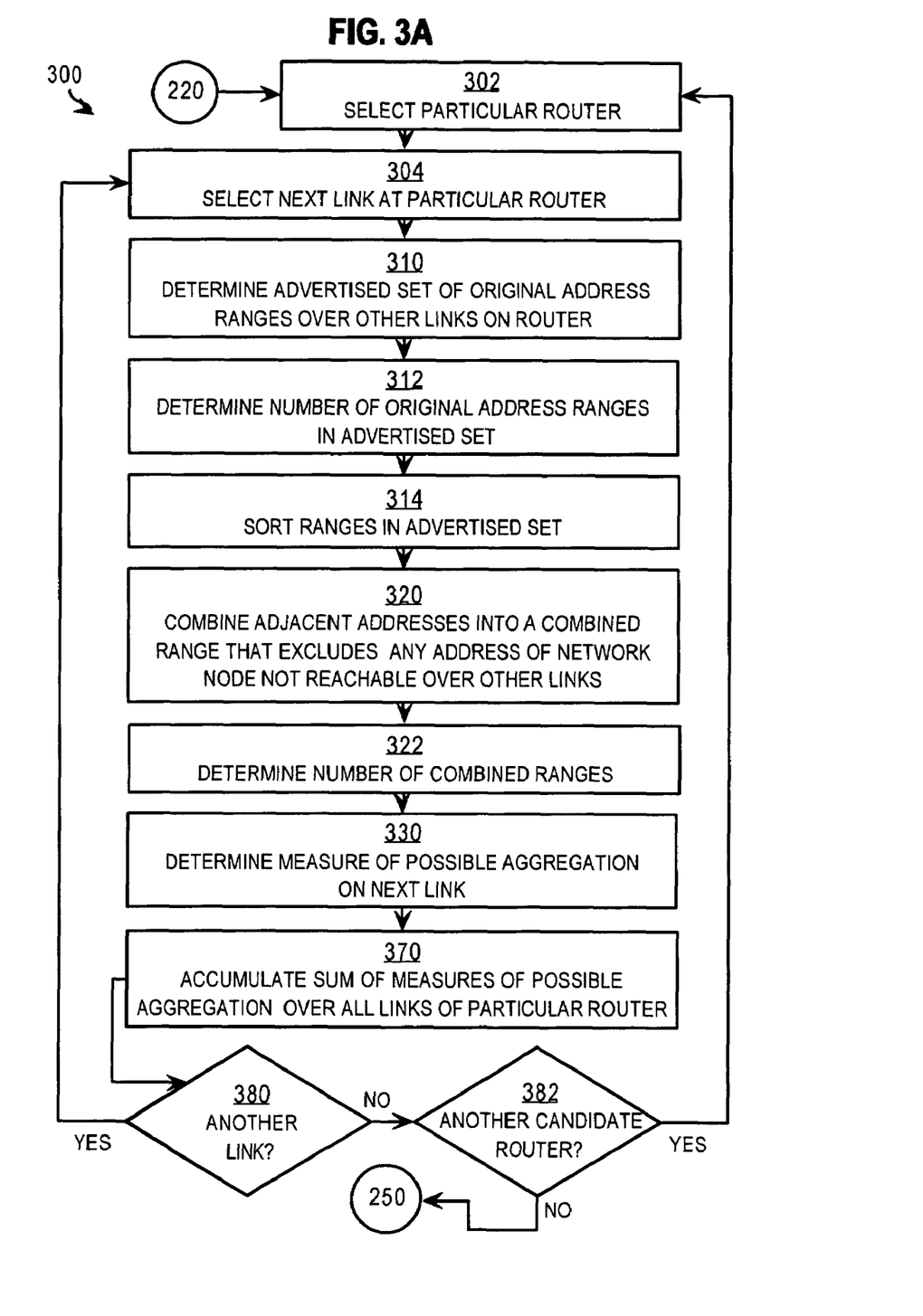
FIG. 3A is a flow diagram that illustrates a method for determining a measure of possible aggregation for each router in group of routers, according to an embodiment.

FIG. 3A is a flow diagram that illustrates a method 300 for determining a measure of possible aggregation for each router in the candidate group of routers, according to an embodiment of step 230. In this embodiment, control passes to step 302 from step 220.

In step 302 a particular router is selected from the candidate set. For example, node 110a is selected. In step 304 a link at the selected router is selected. For example, link A1 to segment 130a on node 110a is selected. In an illustrated embodiment, all links that do not connect to another intermediate node are selected and considered together. For example, links A1 and A2 on node 110a connected to segments 130a, 130b, respectively are selected together in step 304. In some embodiments, step 302 includes determining a center of the network for the particular link and node. For example, the center of the network is defined as a point in the network core where all of the traffic passing between two edge nodes under consideration is forwarded.

In step 310, a set of original address ranges that are advertised on the selected link by the particular router are determined. These addresses are those reachable over the other links of the particular router. In some embodiments, step 310 includes building a tree at the particular node from the destinations reachable through the particular node, toward each interface that leads towards the center of the network. For example, node 110a advertises to nodes on segment 130a connected at link A1 that node 110a can reach network addresses on the other links, namely, all the address ranges in the network 100 other than the segment's own range 10.1.0.0/24 and the range 10.1.1.0/24 of the other segment 130b not toward the center. In the illustrated embodiment, node 110a advertises to nodes on segments 130a, 130b connected at links A1, A2 that node 110a can reach network addresses on the other links, namely, all the address ranges in the network 100 other than those segments' own ranges 10.1.0.0/24 and 10.1.1.0/24, as listed in Table 4A.

TABLE 4A

Example advertised address ranges
for links A1 and A2 on node 110a

| address range |
| --- |
| 10.1.2.0/24 |
| 10.1.3.0/24 |
| 10.1.4.0/24 |
| 10.1.7.0/24 |
| 10.1.6.0/24 |
| 10.1.5.0/24 |

In step 312, the number of original address ranges in the advertised set is determined. For example, the number of advertised ranges in Table 4A is determined to be 6.

In step 314, the ranges in the advertised set are sorted. For example, the ranges in FIG. 4A are sorted to give the set of ranges listed in Table 4B. In some embodiments, step 314 is omitted.

TABLE 4B

Example sorted advertised address ranges
for links A1 and A2 on node 110a

| address range |
| --- |
| 10.1.2.0/24 |
| 10.1.3.0/24 |
| 10.1.4.0/24 |
| 10.1.5.0/24 |
| 10.1.6.0/24 |
| 10.1.7.0/24 |

In step 320, adjacent address ranges reachable over these other links are combined, provided the combined range does not include an address of an actual node of the network that is not reachable over these other links. Any method may be used to combine the ranges.

In the illustrated embodiment, ranges are combined by changing the mask length, so that the ranges are only combined in powers of two. For example, the range from 10.1.2.0/24 to 10.1.0/24 can be combined into one or two ranges. To show this, consider the octets that represent the values 2 through 7, as occurs in the third octet of the addresses in the example addresses. These are listed in table 4C.

TABLE 4C

Example contents of third octet in
address ranges for links A1 and A2

| address range | third octet |
| --- | --- |
| 10.1.2.0/24 | 00000010 |
| 10.1.3.0/24 | 00000011 |
| 10.1.4.0/24 | 00000100 |
| 10.1.5.0/24 | 00000101 |
| 10.1.6.0/24 | 00000110 |
| 10.1.7.0/24 | 00000111 |

The first five bits of this third octet are unchanging, so the mask length could be selected as 21 bits, and the six address ranges could be combined into the one address range 10.1.2.0/21. The range 10.1.2.0/21 does not include the address of any node that can not be reached through node 110b. It is common, in using the mask length convention, that the first address in a range have the value zero in the changing portion. In embodiments using this convention, the six address ranges are combined into two ranges, 10.1.2.0/23 and 10.1.4.0/22.

In one embodiment, step 320 is performed as follows. A tree of destinations reachable through the intermediate network node is built, with the root of the tree an address range that encompasses all ranges reachable through the intermediate network node and perhaps other addresses not reachable. For example, in the illustrated embodiment, the root of the tree is 10.1.0.0/21. At the next level of the tree the address ranges are determined by increasing the mask length by one. In the illustrated embodiment, the next level is represented by the two address ranges 10.1.0.0/22 and 10.1.4.0/22. This process is repeated until there are enough levels in the tree to reach the granularity of the address space. In the illustrated embodiment, the granularity of the address space is a mask length of 24. At each of the address ranges at the highest granularity, the address range is marked by whether that address range is reachable through the current network node. If all child address ranges are reachable, then the child ranges can be combined at the parent address range. An unreachable address space is not included in a combined address to prevent multiple aggregates of the same address space from causing uncertainty in the routing tables.

Table 4D, shows the expanded tree for intermediate network node A. The whole range from 10.1.0.0/24 through 10.1.7.0/24 is covered by the range 10.1.0.0/21. This is the fourth column of table 4D. This range is divided into child ranges with a longer mask of 22; namely, 10.1.0.0/22 and 10.1.4.0/22 in the third column. These are extended to a mask length of 23 in the second column, and finally to a mask length of 24 in the first column.

If an address in the first column is for an existing node that is not reachable through intermediate network node A, the address is marked NULL. If the address is reachable, the node is marked with the node ID, A. In some embodiments, addresses that do not exist anywhere on the network are marked NULL. In some embodiments, addresses that do not exist anywhere on the network are marked reachable by giving the network ID, A; that is, such addresses can be aggregated by the node as if those addresses fall within that level of the tree, because no data packet will be misrouted using an address for a node that does not exist. The highest granularity nodes in the left column are marked first. If both child nodes are marked A, the child nodes can be combined and therefore the parent node is marked as A. If either child is NULL, the parent is marked NULL. The process is repeated until all nodes at one level are NULL or the root of the tree is reached.

As can be seen in Table 4D, address ranges 10.1.2.0/24 and 10.1.3.0/24 can be combined into 10.1.2.0/23. Address ranges 10.1.4.0/24 through 10.1.7.0/24 can be combined into range 10.1.4.0/22. Therefore, the six original address ranges reached through intermediate network node A can be combined into two aggregated ranges 10.1.2.0/23 and 10.1.4.0/22.

In step 322, the number of combined ranges are determined. For example, in one embodiment there is one combined range 10.1.2.0/21. In the illustrated embodiment, there are two combined ranges, 10.1.2.0/23 and 10.1.4.0/22.

In step 330 a measure of possible aggregation on the link is determined. Any method may be used to determine this measure. In some embodiments, the measure of possible aggregation is based on the number of ranges from the original set and the number of ranges in the combined set. For example, the reduction of the number of ranges from six ranges in the original set (listed in Table 4A) to two ranges (10.1.2.0/23 and 10.1.4.0/22) is used as a measure of possible aggregation at node A for the links A1 and A2. Further details on steps that are performed during step 330 in an illustrated embodiment are described below with reference to FIG. 3B.

In step 370, the measure of possible aggregation at each link is added to a cumulative sum over all links at each node to produce a measure of possible aggregation at the router.

In step 380, it is determined whether there is another link to consider at the current router. If so, control passes back to step 304 and following steps to determine and accumulate the measures of possible aggregation over the next link to be considered. As a result of repeating step 310 over all links at a node, a tree is built for each node. The tree extends from the destinations reachable through the node, towards each interface that leads towards the center of the network, as described in more detail below in an example network.

If it is determined in step 380 that there is not another link to consider at the current router, then control passes to step 382. In step 382, it is determined whether there is another router in the candidate set. If so, control passes to step 302 to select the next router in the candidate set. If not, then measures of possible aggregation have been determined for all routers in the candidate set and control passes to step 250 in method 200 to determine the preferred router based on comparing these measures, as described above.

3.2 Determining Measure of Posssible Aggregation at a Link

Figure 3B:
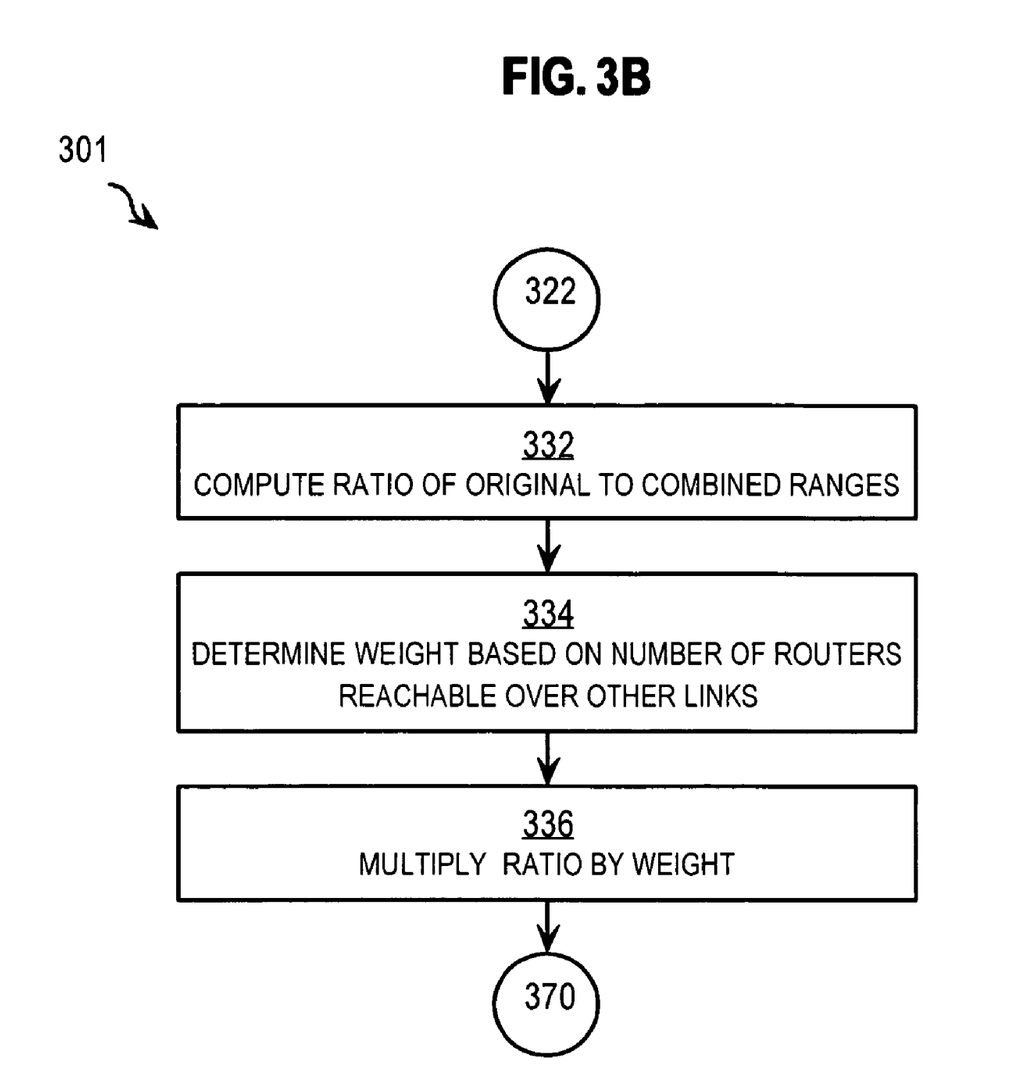
FIG. 3B is a flow diagram that illustrates a method for determining a measure of possible aggregation for a link on a router, according to an embodiment.

FIG. 3B is a flow diagram that illustrates a method 301 for determining a measure of possible aggregation for a link on a router, according to an embodiment of step 330. In step 332 a ratio is computed for the number of original ranges to the number of combined ranges. This ratio indicates a degree to which routes can be summarized along each edge in the

TABLE 4D

Tree addresses reachable through A from link A1 or A2.

| mask length 24 | mask length 23 | mask length 22 | mask length 21 |
| --- | --- | --- | --- |
| 10.1.0.0/24 - NULL | 10.1.0.0/23 - NULL | 10.1.0.0/22 - NULL | 10.1.0.0/21 - NULL |
| 10.1.1.0/24 - NULL | | | |
| 10.1.2.0/24 - A | 10.1.2.0/23 - A | | |
| 10.1.3.0/24 - A | | | |
| 10.1.4.0/24 - A | 10.1.4.0/23 - A | 10.1.4.0/22 - A | |
| 10.1.5.0/24 - A | | | |
| 10.1.6.0/24 - A | 10.1.6.0/23 - A | | |
| 10.1.7.0/24 - A | | | | network. The greater this aggregation ratio, the greater possibility that the particular node can aggregate many address ranges. For example, for links A1 and A2, node 110a reduces six addresses to two addresses for a ratio of 6/2.

In step 334, a weight is determined based on the number of routers reachable over the link. This step is taken in the illustrated embodiment to give more weight to address aggregations that have a bigger impact on network traffic. Thus, even though addresses for link A1 or A2 can be aggregated at node A in the ratio of 6/2, there are no routers on links A1 or A2 to benefit from the aggregation. Therefore the impact of such an aggregation is small. The weight is a measure of the impact of the aggregation performed for a link. In an illustrated embodiment, the weight is equal to the number of routers reached over the link under consideration. Thus, for links A1 and A2 the weight is zero.

In step 336, the product of the ratio multiplied by the weight gives the measure of possible aggregation for the link under consideration. For example, the product for links A1 and A2 is zero. Control then passes to step 370 to complete the method 300 for other links on the selected node, or for links on other nodes in the candidate set.

3.3 Preferred Aggregation Point in Example Network

The working of the illustrated embodiment is further illustrated by describing further computations and use of the measures of possible aggregation for the example network 100 depicted in FIG. 1.

The tree built by repeating steps 310 through 320 for all links at node A is shown in Table 5A, after sorting.

TABLE 5A

Example tree of reachable addresses for node 110a

| intermediate node | link ID | original reachable addresses | combined addresses |
|---|---|---|---|
| node 110a | A1 or A2 | 10.1.2.0/24 | 10.1.2.0/23 |
| " | " | 10.1.3.0/24 | |
| " | " | 10.1.4.0/24 | 10.1.4.0/22 |
| " | " | 10.1.5.0/24 | |
| " | " | 10.1.6.0/24 | |
| " | " | 10.1.7.0/24 | |
| " | AB | 10.1.0.0/24 | 10.1.0.0/23 |
| " | " | 10.1.1.0/24 | |

The tree built by repeating step 310 through 320 for all links at node B is shown in Table 5B, after sorting.

TABLE 5B

Example tree of reachable addresses for node 110b

| intermediate node | link ID | original reachable addresses | combined addresses |
|---|---|---|---|
| node 110b | BA | 10.1.3.0/24 | 10.1.3.0/24 |
| " | " | 10.1.4.0/24 | 10.1.4.0/22 |
| " | " | 10.1.5.0/24 | |
| " | " | 10.1.6.0/24 | |
| " | " | 10.1.7.0/24 | |
| " | B1 | 10.1.0.0/24 | 10.1.0.0/23 |
| " | " | 10.1.1.0/24 | |
| " | " | 10.1.2.0/24 | 10.1.2.0/24 |
| " | " | 10.1.4.0/24 | 10.1.4.0/22 |
| " | " | 10.1.5.0/24 | |
| " | " | 10.1.6.0/24 | |
| " | " | 10.1.7.0/24 | |
| " | BC | 10.1.0.0/24 | 10.1.0.0/22 |
| " | " | 10.1.1.0/24 | |
| " | " | 10.1.2.0/24 | |
| " | " | 10.1.3.0/24 | |

The ratios and weights on each link at each node after repeating step 332 and 334 for every link on every node in network 100 are listed in Table 6.

TABLE 6

Example ratios and weights on links in example network

| intermediate node | link ID | ratio | weight |
|---|---|---|---|
| node 110a | A1 | 6/2 | 0 |
| " | A2 | 6/2 | 0 |
| " | AB | 2/1 | 3 |
| node 110b | BA | 5/2 | 1 |
| " | B1 | 7/3 | 0 |
| " | BC | 4/1 | 2 |
| node 110c | CB | 3/2 | 2 |
| " | C1 | 6/3 | 0 |
| " | CD | 6/3 | 1 |
| node 110d | DC | 1/1 | 3 |
| " | D1 | 7/4 | 0 |

The measures of possible aggregation on each link and at each node after repeating step 336 and 370 for every link on every node in network 100 are listed in Table 7.

TABLE 7

Example measures of possible aggregation in example network

| intermediate node | link ID | link measure | node measure |
|---|---|---|---|
| node 110a | A1 | 0 | 6 |
| " | A2 | 0 | |
| " | AB | 6 | |
| node 110b | BA | 5/2 | 10.5 |
| " | B1 | 0 | |
| " | BC | 8 | |
| node 110c | CB | 3 | 5 |
| " | C1 | 0 | |
| " | CD | 6/3 | |
| node 110d | DC | 3 | 3 |
| " | D1 | 0 | |

As can be seen in Table 7, node 110b has the highest measure of possible aggregation, with a value of 10.5. Thus according to the illustrated embodiment, the preferred node in network 100 for aggregating addresses is node 110b. If objectively selected node 110b is used to aggregate addresses, such as in a level 2 router, instead of subjectively selected node 110c, then network routing efficiency increases.

A measure of network routing improvement can be defined based on the measure of 10.5 using node 110b and the measure of 5 using node 110c. For example, using the ratio as a measure of improvement, the routing improvement using node 110b instead of node 110c is about 10.5/5, equal to 2.1.

If this improvement is considered significant, then it may be concluded that changing the existing or planned network configuration to use node 110b as an aggregation or summarization point is worth the effort. For example, a ratio threshold of 1.5 can be defined. If the ratio is greater than 1.5, then the improvement is considered significant. Employing a threshold of 1.5 indicates that using 110b instead of 110c as the aggregation point provides a significant improvement worth reconfiguring the existing or planned network. In some embodiments, a smaller threshold is used for a planned network and a larger threshold is used for an existing network. For example, a threshold of 1.2 is used for a planned network and a threshold of 2 is used for an existing network.

If an administrator desires to identify two or more aggregation points in a network, then the process is repeated considering the impact of the aggregation provided by the previously determined preferred aggregation nodes, e.g., node 110b. In some embodiments, the impact is twofold. First, the number of total address ranges in the network is reduced as a result of the aggregation performed by the previously determined preferred router (e.g., node 110b). As a result, at least some aggregation ratios change. Secondly, the aggregation weights for the nodes behind the aggregating node changes. For example, from the perspective of node 110a, nodes 110c and 110d are included in node 110b. In some embodiments, the weights computed during step 334 determine that only one node is reachable along the link AB. In some embodiments, the weights computed during step 334 determine that three nodes are still reachable along the link AB.

To reduce the computational load, the address ranges of stub nodes are included within their neighbors in embodiments that do not select stub nodes as aggregation points. For example, in the illustrated embodiments, the weight of stub nodes links that are not directed to other intermediate nodes is zero. This weight makes it unlikely that a stub node would be selected as a preferred router for aggregation. In some embodiments, the number of stub nodes whose addresses are included in neighbors is tracked so that the weight of the neighbors is increased. For example, node 110a can be collapsed onto node 110b by including the address ranges of node 110a in node 110b. In this embodiment, node 110b has a weight of 2 when the impact of node 110b is considered during step 334, described above.

4.0 Implementation Mechanisms—Hardware Overview

Figure 4:
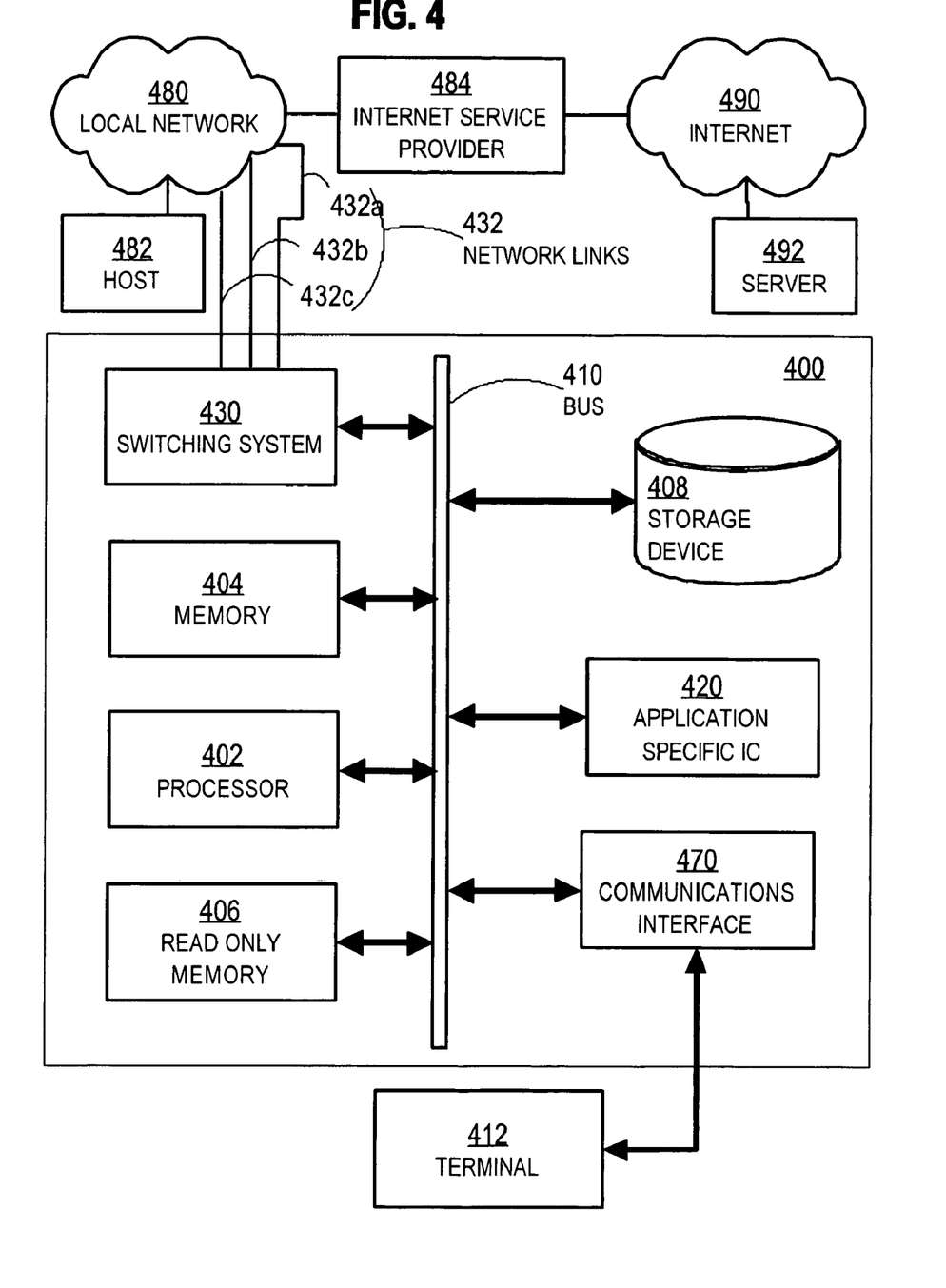
FIG. 4 is a block diagram that illustrates a computer system upon which an embodiment of the invention may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, nonvolatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention. Thus, embodiments of the invention are not limited to any specific combination of hardware and software.

The signals transmitted over network link 432 and other networks through communications interfaces such as interface 470, which carry information to and from computer system 400, are exemplary forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining network nodes for aggregating addresses in routing information used for routing data packets over a network, comprising the steps of:
    receiving link data that indicates direct links between each router in a plurality of candidate routers of a network and at least one of a different router in the network and a network segment in the network;
    receiving reachability data that indicates a set of one or more contiguous network addresses that can be reached on each link described in the link data;
    determining a measure of possible aggregation of contiguous network addresses at the plurality of candidate routers based on the link data and the reachability data; and
    determining a preferred router among the plurality of candidate routers to aggregate addresses in routing information sent between routers in the network based on the measure of possible aggregation at each router in the plurality of candidate routers.

2. A method as recited in claim 1, further comprising, determining a measure of routing performance improvement attainable by reconfiguring the network to aggregate addresses at the preferred router.

3. A method as recited in claim 1, further comprising, reconfiguring the network to aggregate addresses at the preferred router.

4. A method as recited in claim 1, said step of determining the preferred router further comprising determining the preferred router that has a greatest value for the measure of possible aggregation among the plurality of candidate routers.

5. A method as recited in claim 1, wherein the plurality of candidate routers excludes a stub router that is an only router linked to a network segment.

6. A method as recited in claim 1, wherein the plurality of candidate routers excludes a router previously determined to be a preferred router.

7. A method as recited in claim 1, said step of determining the measure of possible aggregation at each router further comprising:
    for a particular link at a particular router, determining an advertised set of address ranges that indicate the ranges of addresses reachable on a different link at the particular router, which different link is different from the particular link;
    determining a number of original address ranges in the advertised set;
    sorting the advertised set of address ranges for the particular link;
    combining adjacent sorted address ranges into a combined range that does not include an address of a node on the network not reachable on the different link at the particular router;
    determining a number of combined ranges in the advertised set; and
    determining the measure of possible aggregation based on the number of original address ranges and the number of combined ranges in the advertised set.

8. A method as recited in claim 7, wherein:
    the method further comprises expressing an address range as a start address that has a fixed number of digits and a prefix length number of digits that do not change over the range, wherein the prefix length is less than the fixed number of digits; and
    said step of combining adjacent sorted address ranges into a combined range further comprising forming a range by using a start address of a lower range of the adjacent sorted address ranges and decreasing a prefix length of the adjacent sorted address ranges.

9. A method as recited in claim 7, said step of determining the measure of possible aggregation further comprising computing a ratio of the number of original address ranges in the advertised set divided by the number of combined ranges in the advertised set.

10. A method as recited in claim 9, said step of determining the measure of possible aggregation further comprising:
    determining a weight based on a number of routers reachable on the particular link; and
    multiplying the weight by the ratio to determine a measure of possible aggregation at the particular node for the particular link.

11. A method as recited in claim 10, said step of determining the measure of possible aggregation further comprising:
    repeating for each link at the particular router different from the particular link said steps of determining an advertised set, determining a number of original address ranges, sorting the advertised set of address ranges, combining adjacent sorted address ranges, determining a number of combined ranges, computing a ratio, determining a weight, and multiplying the weight by the ratio to determine the measure of possible aggregation at the particular node for the link; and
    summing the measures of possible aggregation at the particular node for each link over all the links to the particular node to form the measure of possible aggregation at the particular node.

12. A method as recited in claim 7, wherein the advertised set of address ranges that indicate the ranges of addresses reachable on the different links at the particular router includes a combined address aggregated by a different router previously determined to be a preferred router.

13. A computer-readable medium carrying one or more sequences of instructions for determining network nodes for aggregating addresses in routing information used for routing data packets over a network, wherein execution of the one or more sequences of instructions by one or more processors causes the one or more processors to perform the steps of:
    receiving link data that indicates direct links between each router in a plurality of candidate routers of a network and at least one of a different router in the network and a network segment in the network;
    receiving reachability data that indicates a set of one or more contiguous network addresses that can be reached on each link described in the link data;
    determining a measure of possible aggregation of contiguous network addresses at the plurality of candidate routers based on the link data and the reachability data; and
    determining a preferred router among the plurality of candidate routers to aggregate addresses in routing information sent between routers in the network based on the measure of possible aggregation at each router in the plurality of candidate routers.

14. A computer-readable medium as recited in claim 13, said step of determining the measure of possible aggregation at each router further comprising:
   for a particular link at a particular router, determining an advertised set of address ranges that indicate the ranges of addresses reachable on a different link at the particular router, which different link is different from the particular link;
   determining a number of original address ranges in the advertised set;
   sorting the advertised set of address ranges for the particular link;
   combining adjacent sorted address ranges into a combined range that does not include an address of a node on the network not reachable on the different link at the particular router;
   determining a number of combined ranges in the advertised set;
   determining the measure of possible aggregation based on the number of original address ranges and the number of combined ranges in the advertised set.

15. A computer-readable medium as recited in claim 14, said step of determining the measure of possible aggregation further comprising computing a ratio of the number of original address ranges in the advertised set divided by the number of combined ranges in the advertised set.

16. A computer-readable medium as recited in claim 15, said step of determining the measure of possible aggregation further comprising:
   determining a weight based on a number of routers reachable on the particular link; and
   multiplying the weight by the ratio to determine a measure of possible aggregation at the particular node for the particular link.

17. A computer-readable medium as recited in claim 16, said step of determining the measure of possible aggregation further comprising:
   repeating for each link at the particular router different from the particular link said steps of determining an advertised set, determining a number of original address ranges, sorting the advertised set of address ranges, combining adjacent sorted address ranges, determining a number of combined ranges, computing a ratio, determining a weight, and multiplying the weight by the ratio to determine the measure of possible aggregation at the particular node for the link; and
   summing the measures of possible aggregation at the particular node for each link over all the links to the particular node to form the measure of possible aggregation at the particular node.

18. A computer-readable medium as recited in claim 14, wherein the advertised set of address ranges that indicate the ranges of addresses reachable on the different links at the particular router includes a combined address aggregated by a different router previously determined to be a preferred router.

19. An apparatus for determining network nodes for aggregating addresses in routing information used for routing data packets over a network, comprising:
   means for receiving link data that indicates direct links between each router in a plurality of candidate routers of a network and at least one of a different router in the network and a network segment in the network;
   means for receiving reachability data that indicates a set of one or more contiguous network addresses that can be reached on each link described in the link data;
   means for determining a measure of possible aggregation of contiguous network addresses at the plurality of candidate routers based on the link data and the reachability data; and means for determining a preferred router among the plurality of candidate routers to aggregate addresses in routing information sent between routers in the network based on the measure of possible aggregation at each router in the plurality of candidate routers.

20. An apparatus for determining network nodes for aggregating addresses in routing information used for routing data packets over a network, comprising:
   a network interface that is coupled to a network for communicating therewith a data packet;
   one or more processors;
   a computer-readable medium; and
   one or more sequences of instructions stored in the computer-readable medium, which, when executed by the one or more processors, causes the one or more processors to carry out the step of:
      receiving link data that indicates direct links between each router in a plurality of candidate routers of a network and at least one of a different router in the network and a network segment in the network;
      receiving reachability data that indicates a set of one or more contiguous network addresses that can be reached on each link described in the link data;
      determining a measure of possible aggregation of contiguous network addresses at the plurality of candidate routers based on the link data and the reachability data; and
      determining a preferred router among the plurality of candidate routers to aggregate addresses in routing information sent between routers in the network based on the measure of possible aggregation at each router in the plurality of candidate routers.

21. An apparatus as recited in claim 20, wherein execution of the one or mores sequences of instructions further causes the one or more processors to carry out the step of determining a measure of routing performance improvement attainable by reconfiguring the network to aggregate addresses at the preferred router.

22. An apparatus as recited in claim 20, wherein execution of the one or mores sequences of instructions further causes the one or more processors to carry out the step of reconfiguring the domain of the network to aggregate addresses at the particular preferred router.

23. An apparatus as recited in claim 20, said step of determining the preferred router further comprising determining the preferred router that has a greatest value for the measure of possible aggregation among the plurality of candidate routers.

24. An apparatus as recited in claim 20, wherein the plurality of candidate routers excludes a stub router that is an only router linked to a network segment.

25. An apparatus as recited in claim 20, wherein the plurality of candidate routers excludes a router previously determined to be a preferred router.

26. An apparatus as recited in claim 20, said step of determining the measure of possible aggregation at each router further comprising:
   for a particular link at a particular router, determining an advertised set of address ranges that indicate the ranges of addresses reachable on a different link at the particular router, which different link is different from the particular link;
   determining a number of original address ranges in the advertised set;

sorting the advertised set of address ranges for the particular link;

combining adjacent sorted address ranges into a combined range that does not include an address of a node on the network not reachable on the different link at the particular router;

determining a number of combined ranges in the advertised set;

determining the measure of possible aggregation based on the number of original address ranges and the number of combined ranges in the advertised set.

27. An apparatus as recited in claim 26, wherein:

execution of the one or mores sequences of instructions further causes the one or more processors to carry out the step of expressing an address range as a start address that has a fixed number of digits and a prefix length number of digits that do not change over the range, wherein the prefix length is less than the fixed number of digits; and said step of combining adjacent sorted address ranges into a combined range further comprising forming a range by using a start address of a lower range of the adjacent sorted address ranges and decreasing a prefix length of the adjacent sorted address ranges.

28. An apparatus as recited in claim 26, said step of determining the measure of possible aggregation further comprising computing a ratio of the number of original address ranges in the advertised set divided by the number of combined ranges in the advertised set.

29. An apparatus as recited in claim 28, said step of determining the measure of possible aggregation further comprising:

determining a weight based on a number of routers reachable on the particular link; and multiplying the weight by the ratio to determine a measure of possible aggregation at the particular node for the particular link.

30. An apparatus as recited in claim 29, said step of determining the measure of possible aggregation further comprising:

repeating for each link at the particular router different from the particular link said steps of determining an advertised set, determining a number of original address ranges, sorting the advertised set of address ranges, combining adjacent sorted address ranges, determining a number of combined ranges, computing a ratio, determining a weight, and multiplying the weight by the ratio to determine the measure of possible aggregation at the particular node for the link; and summing the measures of possible aggregation at the particular node for each link over all the links to the particular node to form the measure of possible aggregation at the particular node.

31. An apparatus as recited in claim 26, wherein the advertised set of address ranges that indicate the ranges of addresses reachable on the different links at the particular router includes a combined address aggregated by a different router previously determined to be a preferred router.

* * * * *